N. RASMUSSEN.
SPRING BEARING FOR CENTRIFUGAL SEPARATORS.
APPLICATION FILED MAR. 23, 1917.
1,235,841.
Patented Aug. 7, 1917.
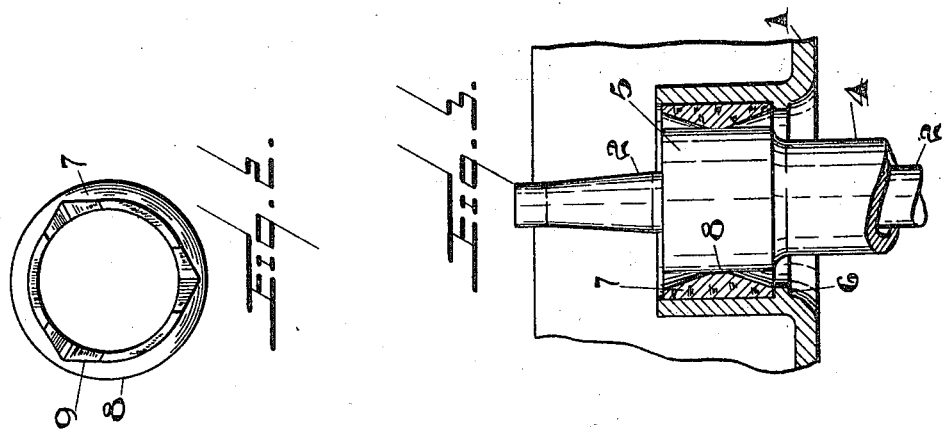
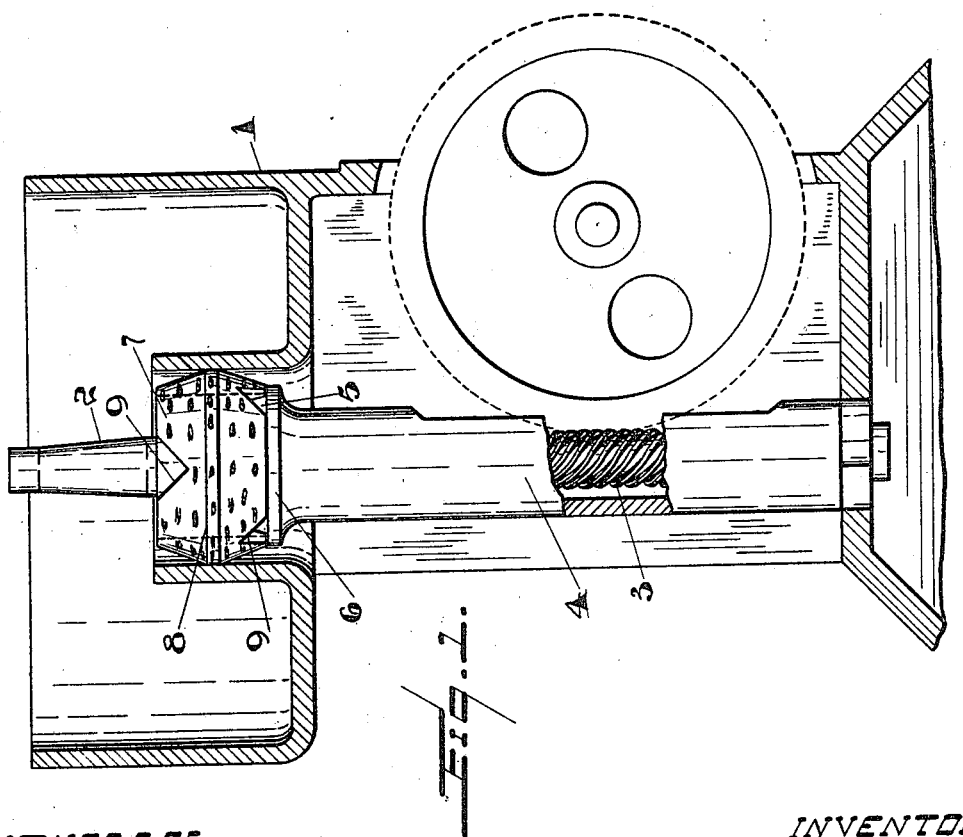
WITNESSES.
INVENTOR
N. Rasmussen.
BY J. Edward Maybee
ATTY.

UNITED STATES PATENT OFFICE.

NICOLAUS RASMUSSEN, OF TORONTO, ONTARIO, CANADA.

SPRING-BEARING FOR CENTRIFUGAL SEPARATORS.

1,235,841.　　　　　　　Specification of Letters Patent.　　　Patented Aug. 7, 1917.

Application filed March 23, 1917.　Serial No. 157,042.

*To all whom it may concern:*

Be it known that I, NICOLAUS RASMUSSEN, of the city of Toronto, in the county of York, Province of Ontario, Canada, have invented certain new and useful Improvements in Spring-Bearings for Centrifugal Separators, of which the following is a specification.

This invention relates particularly to spring bearings used to yieldingly support the upper end of the spindle of a centrifugal separator, and my object is to devise a satisfactory substitute for the metal springs now commonly employed.

I attain my object by employing as a spring a ring of cork fitted on the bearing for the spindle and bearing against the wall of a cylindrical recess in the casing or frame of the separator. This spring ring is shaped and constructed substantially as hereinafter described and as illustrated in the accompanying drawings in which—

Figure 1 is a side elevation, partly in section of a cream separator provided with my improved spring bearing;

Fig. 2 a plan view of the spring removed; and

Fig. 3 is a detail showing a modified arrangement of the spring.

In the drawings like numerals of reference indicate corresponding parts in the different figures.

In such apparatus as centrifugal liquid separators, to avoid shaking due to any lack of balance in the rotating parts, it is common to yieldingly support the upper end of the bowl spindle, and the present invention relates particularly to a specific form of the spring bearing, and only enough of the separator is indicated in the drawing to show the location and arrangement of the novel features.

Having reference particularly to Fig. 1, 1 is the casing and frame of a centrifugal separator and 2 the spindle provided with a worm 3. In the present case this spindle is shown as surrounded by a tube 4 in which the spindle has its bearing in an ordinary manner. My invention is, however, adapted to other forms of separator in which the tube is not employed.

5 is the upper bearing of the spindle, which is preferably formed with the shoulder 6 at its lower end to retain in position the spring ring hereinafter described. About the bearing and in engagement with the shoulder is fitted a ring 7 formed of cork, which may be either cut from the solid slab of cork or formed of molded and compressed cork. This ring in cross section, is preferably substantially shaped as an isosceles triangle, the apex, however, being blunted so that a belt 8 is formed extending around the ring, from which belt the ring tapers to the upper and lower edges. This arrangement gives excellent resiliency with plenty of surface bearing on the bearing 5.

The resiliency of the ring is further enhanced by deeply serrating the upper and lower edges by means of the notches 9, the notches on one edge preferably breaking joint with the notches on the other edge. This arrangement also gives the ring a certain amount of expansibility which enables it to be readily slipped in place on the bearing.

While the arrangement shown is preferable, it is evident that the belt 8 might be formed at the inner circumference of the ring and the broad bearing surface on the outer circumference as indicated in Fig. 3, the shoulder 6 in this case being formed on the casing 1.

The advantages of my construction are many. The cork is a very inert substance so that it will not be spoiled by contact with grease, oil, or fatty acids of any kind. It is not subject to crystallization and will maintain its resiliency under all conditions. It is cheap, easily made and, if damaged, is easily replaced at any time.

What I claim as my invention is:

1. In a spring bearing, the combination of the bowl spindle; a bearing for the spindle; the casing bored to loosely receive the bearing; and a ring of cork fitted between the bearing and casing and under slight compression, said ring having a broad surface engaging one of the parts and a narrow surface engaging the other.

2. In a spring bearing, the combination of the bowl spindle; a bearing for the spindle; the casing bored to loosely receive the bearing; and a ring of cork fitted between the bearing and casing and under slight compression, said ring having a narrow central belt engaging one of the parts and a broad surface engaging the other part, the ring being beveled each way from the central belt.

3. A spring for a spring bearing comprising a cork ring in cross section having substantially the form of an isosceles triangle.

4. A spring for a spring bearing comprising a cork ring in cross section having substantially the form of an isosceles triangle and having its edges formed with deep serrations.

5. A spring for a spring bearing comprising a cork ring in cross section having substantially the form of an isosceles triangle and having its edges formed with deep serrations, the serrations of one edge breaking joint with those of the other.

Signed at Toronto, this 16th day of March, 1917.

NICOLAUS RASMUSSEN.

Copies of this patent may be obtained for five cents each, by addressing the "Commissioner of Patents, Washington, D. C."